R. A. LOVELL.
PISTON RING.
APPLICATION FILED JULY 19, 1920.
1,378,251.
Patented May 17, 1921.
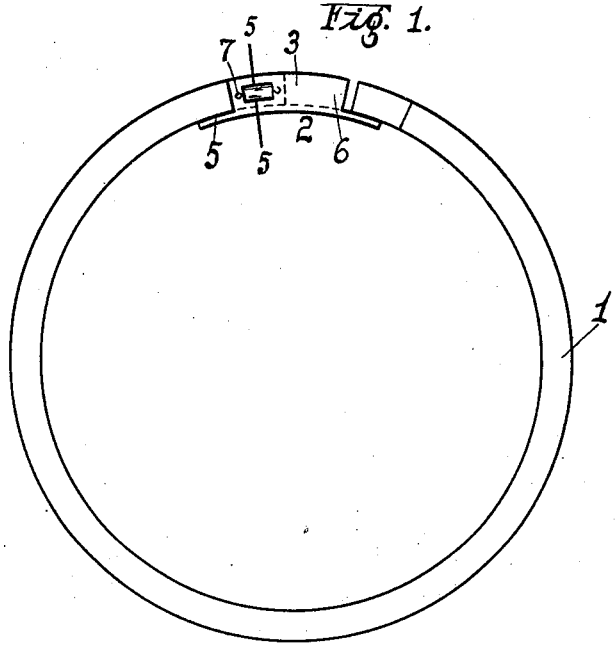
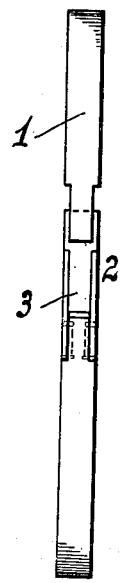
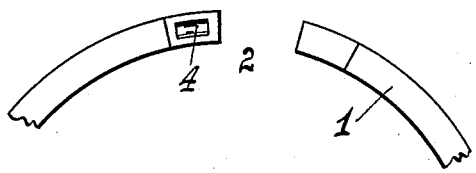
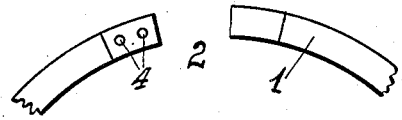
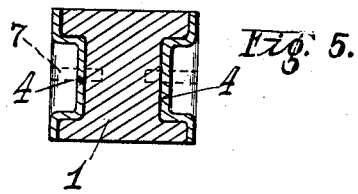
Inventor
Roy A. Lovell.
By Harry C. Schroeder
Attorney

UNITED STATES PATENT OFFICE.

ROY A. LOVELL, OF SAN FRANCISCO, CALIFORNIA.

PISTON-RING.

1,378,251.            Specification of Letters Patent.       Patented May 17, 1921.

Application filed July 19, 1920. Serial No. 397,445.

*To all whom it may concern:*

Be it known that I, ROY A. LOVELL, a citizen of the United States, residing at San Francisco, in the county of San Francisco and State of California, have invented certain new and useful Improvements in Piston-Rings, of which the following is a specification.

This invention is an improved piston ring joint for preventing leakage past the ring through its split.

One of the objects is to provide a joint which will not loosen from the vibration and impact in a piston.

This object is accomplished by means of an improved method of securing the joint sleeve to the piston ring, as will be shown in the accompanying drawing, forming part of this specification and in which—

Figure 1 is a side view of a piston ring employing my joint.

Fig. 2 is a side view of the same.

Fig. 3 is a fragmentary side view of the joint with the sleeve removed.

Fig. 4 is a fragmentary side view of a modified form of joint, with the sleeve removed.

Fig. 5 is an enlarged sectional view taken on the line 5—5 of Fig. 1.

In the drawing, 1 indicates a piston ring split at 2. The adjoining ends of the ring are inset to allow the sleeve 3 to set flush with the edges of the ring. The sleeve 3 is secured to one end of the ring by being pressed into holes 4 in the sides of the ring. The hole 4 may be a single elongated cavity on either side as shown in Fig. 3, or two holes may be drilled on either side as shown in Fig. 4.

A lip 5 extends rearwardly of the secured side of the sleeve 3, the other end 6 of which is free and passes under the other end of the joint 2. The sleeve 3 effectively seals the joint 2 and the method of securing said sleeve to the ring, viz.; by indenting same into said ring, makes a very strong and long wearing joint.

Pins 7 are driven through the sleeve 3, on either side of the hole 4, thus insuring a strong joint which will not loosen.

Having described my invention, I claim:

In a split piston ring, a sleeve having side walls and a bottom, adapted to extend across said split, indentations in the edges of the piston ring into which the side walls of the sleeve are adapted to fit, and pins on either side of said indentations passing through said side walls.

In testimony whereof I affix my signature.

ROY A. LOVELL.